(12) United States Patent
Lin et al.

(10) Patent No.: US 7,897,547 B1
(45) Date of Patent: Mar. 1, 2011

(54) VISCOELASTIC SURFACTANT RHEOLOGY MODIFIER

(75) Inventors: Lijun Lin, Sugar Land, TX (US); Leiming Li, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/643,475

(22) Filed: Dec. 21, 2009

(51) Int. Cl.
*C09K 8/584* (2006.01)

(52) U.S. Cl. ......... 507/234; 507/240; 507/244; 507/246; 507/248; 507/261; 166/305.1

(58) Field of Classification Search .......... None
See application file for complete search history.

(56) References Cited

U.S. PATENT DOCUMENTS

| | | | |
|---|---|---|---|
| 5,836,390 A * | 11/1998 | Apps et al. ................ 166/281 |
| 7,320,952 B2 | 1/2008 | Chen et al. |
| 7,378,378 B2 | 5/2008 | Chen et al. |
| 7,387,986 B2 | 6/2008 | Chen et al. |
| 7,387,987 B2 | 6/2008 | Chen et al. |
| 7,402,549 B2 | 7/2008 | Chen et al. |
| 2009/0155325 A1 * | 6/2009 | Wenzel et al. ............ 424/402 |
| 2010/0120637 A1 * | 5/2010 | Bendejacq et al. ......... 507/219 |

\* cited by examiner

*Primary Examiner* — John J Figueroa
(74) *Attorney, Agent, or Firm* — Martin Rzaniak; David Cate; Robin Nava (57) ABSTRACT

A method for shortening the shear recovery time of cationic, nonionic, anionic, zwitterionic, and amphoteric viscoelastic surfactant fluid systems by adding an effective amount of an amphiphilic polymeric rheology enhancer. The rheology enhancer is a grafted polymer of polydimethylsiloxane, for example polydimethylsiloxanes grafted with ethylene/propylene glycol. The rheology enhancer also increases fluid viscosity and very low rheology enhancer concentration is needed.

23 Claims, 2 Drawing Sheets

VISCOELASTIC SURFACTANT RHEOLOGY MODIFIER

FIELD

The invention relates to rheology enhancers for viscoelastic surfactant fluid systems (VES's). More particularly it relates to selection and optimization of rheology enhancers for fluid systems to be used over broad ranges of salinity and temperature. Most particularly it relates to rheology enhancers to shorten shear recovery times and increase the viscosity of VES's for use in oilfield treatment fluids.

BACKGROUND

The statements in this section merely provide background information related to the present disclosure and may not constitute prior art.

Certain surfactants, when in aqueous solution, form viscoelastic fluids. Such surfactants are termed "viscoelastic surfactants", or "VES's". Other components, such as additional VES's, co-surfactants, buffers, acids, solvents, and salts, are optional or necessary (depending upon the specific VES fluid system used) and perform such functions as increasing the stability (especially thermal stability) or increasing the viscosity of the systems by modifying and/or stabilizing the micelles; all the components together are called a viscoelastic surfactant system. Not to be limited by theory, but many viscoelastic surfactant systems form long rod-like or worm-like micelles in aqueous solution. Entanglement of these micelle structures gives viscosity and elasticity to the fluid. For a fluid to have good viscosity and elasticity under given conditions, proper micelles must be formed and proper entanglement is needed. This requires the surfactant's structure to satisfy certain geometric requirements and the micelles to have sufficient length or interconnections for adequate entanglements.

Many chemical additives are known to improve the rheological behavior (greater viscosity and/or greater stability and/or greater brine tolerance and/or lower shear sensitivity and/or faster rehealing if micelles are disrupted, for example by shear). Such materials are typically called co-surfactants, rheology modifiers, or rheology enhancers, etc., and typically are alcohols, organic acids such as carboxylic acids and sulfonic acids, sulfonates, and others. We will use the term rheology enhancers herewith. Such materials often have different effects, depending upon their exact composition and concentration, relative to the exact surfactant composition (for example hydrocarbon chain lengths of groups in the surfactant and co-surfactant) and concentration. For example, such materials may be beneficial at some concentrations and harmful (lower viscosity, reduced stability, greater shear sensitivity, longer rehealing times) at others.

In particular, many VES fluid systems exhibit long viscosity recovery times after experiencing prolonged high shear. Slow recovery negatively impacts drag reduction and proppant transport capability, which consequently lead to undesirably high treating pressures and risks of near wellbore screen-outs. Although additives are known that can shorten VES shear recovery times and increase viscosities, there is a need for additional simple, inexpensive rheology enhancers.

SUMMARY

One embodiment is an oilfield treatment method consisting of preparing and injecting down a well a fluid containing a viscoelastic surfactant selected from zwitterionic, amphoteric, nonionic, anionic, and cationic surfactants and mixtures of those surfactants, and a rheology enhancer in a concentration sufficient to shorten the shear recovery time of the fluid, in which the rheology enhancer is a grafted polymer of poly-dimethylsiloxane. The grafted polymer may be grafted with alkylene glycol. The grafted polymer may be grafted with ethylene/propylene glycol. The rheology enhancer may also increase the viscosity of the fluid.

The viscoelastic surfactant system may contain a zwitterionic surfactant, for example a surfactant or mixture of surfactants having the formula:

in which R is an alkyl group that contains from about 11 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$. The zwitterionic surfactant may have the betaine structure:

in which R is a hydrocarbon group that may be branched or straight chained, aromatic, aliphatic or olefinic and has from about 14 to about 26 carbon atoms and may contain an amine; n=about 2 to about 4; and p=1 to about 5, and mixtures of these compounds. The betaine may be oleylamidopropyl betaine or erucylamidopropyl betaine and may contain a co-surfactant.

The viscoelastic surfactant system may contain a cationic surfactant, for example a surfactant or mixture of surfactants having the structure:

in which $R_1$ has from about 14 to about 26 carbon atoms and may be branched or straight chained, aromatic, saturated or unsaturated, and may comprise a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion; and mixtures of these compounds. As a further example, $R_1$ contains from about 18 to about 22 carbon atoms and may contain a carbonyl, an amide, or an amine; $R_2$, $R_3$, and $R_4$ contain from 1 to about 3 carbon atoms, and $X^-$ is a halide. As a further example, $R_1$ comprises from about 18 to about 22 carbon atoms and may comprise a carbonyl, an amide, or an amine, and $R_2$, $R_3$, and $R_4$ are the same as one another and comprise from 1 to about 3 carbon atoms. The cationic viscoelastic surfactant system optionally contains amines, alcohols, glycols, organic salts, chelating agents, solvents, mutual solvents, organic acids, organic acid salts, inorganic salts, oligomers, polymers, co-polymers, and mixtures of said materials, present at a concentration of between about 0.01 and about 10 percent, for example at a concentration of between about 0.01 and about 1 percent. The amphoteric surfactant may be, for example, an amine oxide, for example an amidoamine oxide.

The rheology enhancer may be present in the fluid at a concentration of from about 0.0001% to about 0.5%, for example at a concentration of from about 0.0001% to about 0.05%.

The fluid further may optionally contain an acid selected from hydrochloric acid, hydrofluoric acid, formic acid, acetic acid, lactic acid, glycolic acid, polylactic acid, polyglycolic acid, sulfamic acid, malic acid, citric acid, tartaric acid, maleic acid, methylsulfamic acid, chloroacetic acid, and mixtures of these acids.

Another embodiment is a method of shortening the shear recovery time of a viscoelastic surfactant based fluid containing a viscoelastic surfactant selected from zwitterionic, amphoteric, and cationic surfactants and mixtures of those surfactants, consisting of adding a rheology enhancer, in a concentration sufficient to shorten the shear recovery time of the fluid, the rheology enhancer being a grafted polymer of polydimethylsiloxane.

Yet another embodiment is a composition containing a viscoelastic surfactant selected from zwitterionic, amphoteric, nonionic, anionic, and cationic surfactants and mixtures of those surfactants; and a rheology enhancer in a concentration sufficient to shorten the shear recovery time of the fluid, the rheology enhancer being a grafted polymer of polydimethylsiloxane.

In addition to oilfield uses, the rheology enhancer of the invention may be used in household and industrial cleaners, agricultural chemicals, personal hygiene products, cosmetics, pharmaceuticals, printing and other fields.

DETAILED DESCRIPTION

At the outset, it should be noted that in the development of any actual embodiments, numerous implementation-specific decisions must be made to achieve the developer's specific goals, such as compliance with system and business related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating embodiments of the invention and should not be construed as a limitation to the scope and applicability of the invention. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range disclosed and enabled the entire range and all points within the range.

The following definitions are provided in order to aid those skilled in the art in understanding the detailed description of the invention.

The term "surfactant" refers to a soluble or partially soluble compound that reduces the surface tension of liquids, or reduces inter-facial tension between two liquids, or a liquid and a solid by congregating and orienting itself at these interfaces.

The term "viscoelastic" refers to those viscous fluids having elastic properties, i.e., the liquid at least partially returns to its original form when an applied stress is released.

The phrase "viscoelastic surfactant" or "VES" refers to that class of compounds which can form micelles (spherulitic, anisometric, lamellar, or liquid crystal) in the presence of counter ions in aqueous solutions, thereby imparting viscosity to the fluid. Anisometric micelles can be used, as their behavior in solution most closely resembles that of a polymer.

When fluids are viscosified by the addition of viscoelastic surfactant systems, the viscosity increase is believed to be due to the formation of micelles, for example worm-like micelles, which entangle to give structure to the fluid that leads to the viscosity. In addition to the viscosity itself, an important aspect of a fluid's properties is the degree and rate of viscosity-recovery or re-healing when the fluid is subjected to high shear and the shear is then reduced. For VES fluids, shear may disrupt the micelle structure, after which the structure reforms. Controlling the degree and rate of reassembling (re-healing) is necessary to maximize performance of the surfactant system for different applications. For example, in hydraulic fracturing it is critical for the fluid to regain viscosity as quickly as possible after exiting the high-shear region in the tubulars and entering the low-shear environment in the hydraulic fracture. On the other hand, it is beneficial in coiled tubing cleanouts to impart a slight delay in regaining full viscosity in order to "jet" the solids more efficiently from the bottom of the wellbore into the annulus. Once in the annulus the regained viscosity ensures that the solids are effectively transported to the surface.

Viscoelastic surfactant fluid systems have been shown to have excellent rheological properties for hydraulic fracturing applications; however, shear recovery time, not fluid viscosity, often dictates the minimum concentration of surfactant required. For example, a fluid made with a certain concentration of surfactant may show adequate viscosity for fracturing at a given temperature, but the minimal usable concentration may be high due to slow shear recovery with a lower concentration. An acceptable shear recovery time is considered to be 15 seconds. A time longer than 15 seconds will negatively impact drag reduction and proppant transport. Shortening the viscosity-recovery time makes it possible to use VES fluid systems that would otherwise not be suitable in many applications. In addition, when a rheology modifier also increases fluid viscosity, then less surfactant is needed to provide a given viscosity. Examples of rheology enhancers are given in U.S. Pat. No. 7,341,980, which is assigned to the same assignee as the present invention and which is hereby incorporated in its entirety.

We have found that certain simple additives, when included in certain viscoelastic surfactant fluid systems (such as cationic, nonionic, anionic, amphoteric, and zwitterionic viscoelastic surfactant fluid systems, especially betaine viscoelastic surfactant fluid systems), in the proper concentration relative to the surfactant active ingredient, significantly shorten the shear recovery time of the systems, increasing the viscosity at the same time. In many cases, the shear recovery is nearly instantaneous.

We have found new classes of chemical additives that are effective for shortening the rehealing time after high shear, and increasing the viscosity of VES systems at a given temperature, making the fluids more useful for many purposes, such as, but not limited to, uses as oilfield treatment fluids, especially stimulation fluids, most especially hydraulic fracturing fluids. We will call these materials "rheology enhancers" here. The rheology enhancers extend the conditions under which the VES systems can be used, and reduce the amount of surfactant needed, which in turn reduces the cost and improves clean-up.

Suitable rheology enhancers include amphiphilic polymers (having some polar groups on an otherwise water-insoluble backbone, or having side chains that themselves are water soluble backbones, and/or having some insoluble groups or segments on the backbone or on the side chain(s), or on both, so that the polymer is soluble in both water and organic solvents and has an affinity to both polar and nonpolar solvents), for example polymers or copolymers containing grafted polymer of polydimethylsiloxane (PDMS) consisting of or containing the following structure or structure segment:

with R being an hydrophilic group. Other suitable amphiphilic polymers include polydimethylsiloxanes grafted with alkylene glycol. It should be understood that when we refer to polymers, we include copolymers.

Also, other suitable amphiphilic polymers include a water soluble polydimethylsiloxanes grafted with ethylene/propylene glycol according to the following structure:

Examples of such polymers can be purchased from Sigma-Aldrich. They are characterized as a clear liquid and readily soluble in water. One example of polymer is the poly[dimethylsiloxane-co-methyl(3-hydroxypropyl)siloxane]-graft-poly(ethylene/propylene glycol) as shown above.

Other polymers that may be used in combination with the rheology enhancer described herewith include those described in U.S. Pat. Nos. 5,760,154 (except those containing polysaccharides) and 5,147,907 (the portion not containing dextrins). Also useful as part of all of the rheology enhancer are polymers shown in U.S. Pat. No. 5,574,124 (such as terpolymers of acrylic acid, maleic anhydride and vinyl acetate). Also useful as part of all of the rheology enhancer are polymers shown in U.S. Pat. No. 6,207,780 (such as polymers built up of a) monoethylenically unsaturated dicarboxylic acids and/or their salts, b) monoethylenically unsaturated monocarboxylic acids and/or their salts, c) monounsaturated monomers which, after hydrolysis or saponification, can be converted into monomers having a hydroxyl group covalently bonded at the C—C-chain, d) monoethylenically unsaturated sulfonic acid groups or sulfate groups-containing monomers, and optionally e) further radically copolymerizable monomers). Also useful as part of all of the rheology enhancer are polymers shown in U.S. Pat. Nos. 7,387,986; 7,320,952; 7,387,987; 7,402,549 and 7,378,378.

The amphiphilic polymer or copolymer rheology enhancer may be linear, branched, or have a comb, dendritic, brush, graft, star or star-branched shape. It may contain repeating units other than polydimethylsiloxanes.

Suitable concentrations in the final fluid system are from about 0.0001% to about 0.5%, for example from about 0.0001% to about 0.05%. These are very low concentrations for rheology enhancers.

The rheology enhancers give the desired results with cationic, nonionic, anionic, amphoteric, and zwitterionic viscoelastic surfactant systems. They have been found to be particularly effective with certain zwitterionic surfactants. In general, particularly suitable zwitterionic surfactants have the formula:

in which R is an alkyl group that contains from about −11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$.

Preferred zwitterionic surfactants include betaines. Two suitable examples of betaines are BET-O and BET-E. The surfactant in BET-O-30 is shown below; one chemical name is oleylamidopropyl betaine. It is designated BET-O-30 because as obtained from the supplier (Rhodia, Inc. Cranbury, N.J., U.S.A.) it is called Mirataine BET-O-30 because it contains an oleyl acid amide group (including a $C_{17}H_{33}$ alkene tail group) and contains about 30% active surfactant; the remainder is substantially water, sodium chloride, and propylene glycol. An analogous material, BET-E-40, is also available from Rhodia and contains an erucic acid amide group (including a $C_{21}H_{41}$ alkene tail group) and is approximately 40% active ingredient, with the remainder being substantially water, sodium chloride, and isopropanol. VES systems, in particular BET-E-40, optionally contain about 1% of a condensation product of a naphthalene sulfonic acid, for example sodium polynaphthalene sulfonate, as a rheology modifier, as described in U.S. Pat. No. 7,084,095. The surfactant in BET-E-40 is also shown below; one chemical name is erucylamidopropyl betaine. BET surfactants, and other VES's are described in U.S. Pat. No. 6,258,859. According to that patent, BET surfactants make viscoelastic gels when in the presence of certain organic acids, organic acid salts, or inorganic salts; in that patent, the inorganic salts were present at a weight concentration up to about 30%. Co-surfactants may be useful in extending the brine tolerance, and to increase the gel strength and to reduce the shear sensitivity of the VES-fluid, in particular for BET-O-type surfactants. An example given in U.S. Pat. No. 6,258,859 is sodium dodecylbenzene sulfonate (SDBS), also shown below. Other suitable co-surfactants include, for example those having the SDBS-like structure in which x=5-15; preferred co-surfactants are those in which x=7-15. Still other suitable co-surfactants for BET-O-30 are certain chelating agents such as trisodium hydroxyethylethylenediamine triacetate. The rheology enhancers may be used with viscoelastic surfactant fluid systems that contain such additives as co-surfactants, organic acids, organic acid salts, and/or inorganic salts.

Surfactant in BET-O-30 (when n = 3 and p = 1)

Surfactant in BET-E-40 (when n = 3 and p = 1)

SDBS (when x = 11 and the counterion is Na$^+$)

Some embodiments use betaines; for example BET-E-40. Although experiments have not been performed, it is believed that mixtures of betaines, especially BET-E-40, with other surfactants are also suitable.

Other betaines that are suitable include those in which the alkene side chain (tail group) contains 11-23 carbon atoms (not counting the carbonyl carbon atom) which may be branched or straight chained and which may be saturated or unsaturated, n=2-10, and p=1-5, and mixtures of these compounds. Betaines are those in which the alkene side chain contains 11-21 carbon atoms (not counting the carbonyl carbon atom) which may be branched or straight chained and which may be saturated or unsaturated, n=3-5, and p=1-3, and mixtures of these compounds. These surfactants are used at a concentration of about 0.5 to about 10%, or from about 1 to about 6%, and or from about 1.5 to about 6%.

Exemplary cationic viscoelastic surfactants include the amine salts and quaternary amine salts disclosed in U.S. Pat. Nos. 5,979,557, and 6,435,277 which are hereby incorporated by reference.

Examples of suitable cationic viscoelastic surfactants include cationic surfactants having the structure:

in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and X$^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4)X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received commercially available VES surfactant concentrate formulations, for example cationic VES surfactant formulations, may also optionally contain one or more members of the group consisting of alcohols, glycols, organic salts, chelating agents, solvents, mutual solvents, organic acids, organic acid salts, inorganic salts, oligomers, polymers, copolymers, and mixtures of these members. They may also contain performance enhancers, such as viscosity enhancers, for example polysulfonates, for example polysulfonic acids, as described in U.S. Pat. No. 7,084,095 which is hereby incorporated by reference.

Another suitable cationic VES is erucyl bis(2-hydroxyethyl)methyl ammonium chloride, also known as (Z)-13 docosenyl-N-N-bis(2-hydroxyethyl)methyl ammonium chloride. It is commonly obtained from manufacturers as a mixture containing about 60 weight percent surfactant in a mixture of isopropanol, ethylene glycol, and water. Other suitable amine salts and quaternary amine salts include (either alone or in combination in accordance with the invention), erucyl trimethyl ammonium chloride; N-methyl-N,N-bis(2-hydroxyethyl) rapeseed ammonium chloride; oleyl methyl bis(hydroxyethyl) ammonium chloride; erucylamidopropyltrimethylamine chloride, octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; and cetylamino, N-octadecyl pyridinium chloride.

Many fluids made with viscoelastic surfactant systems, for example those containing cationic surfactants having structures similar to that of erucyl bis(2-hydroxyethyl)methyl ammonium chloride, inherently have short re-heal times and the rheology enhancers may not be needed except under special circumstances, for example at very low temperature.

The viscoelastic surfactant system may also be based upon any suitable anionic surfactant. In some embodiments, the anionic surfactant is an alkyl sarcosinate. The alkyl sarcosinate can generally have any number of carbon atoms. Alkyl sarcosinates can have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms. The anionic surfactant is represented by the chemical formula:

$$R_1CON(R_2)CH_2X$$

wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Pat. Nos. 6,239,183; 6,506,710; 7,060,661; 7,303,018; and 7,510,009, for example amidoamine oxides. These six references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

Viscoelastic surfactant fluids, for example those used in the oilfield, may also contain agents that dissolve minerals and compounds, for example in formations, scale, and filtercakes. Such agents may be, for example, hydrochloric acid, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, for example trisodium hydroxyethylethylenediamine triacetate, and salts of these acids and mixtures of these acids and/or salts. For sandstone treatment, the fluid also typically contains a hydrogen fluoride source. The hydrogen fluoride source may be HF itself or may be selected from ammonium fluoride and/or ammonium bifluoride or mixtures of the two; when strong acid is present the HF source may also be one or more of polyvinylammonium fluoride, polyvinylpyridinium fluoride, pyridinium fluoride, imidazolium fluoride, sodium tetrafluoroborate, ammonium tetrafluoroborate, and salts of hexafluoroantimony. When the formation-dissolving agent is a strong acid, the fluid preferably contains a corrosion inhibitor. The fluid optionally contains chelating agents for polyvalent cations, for example especially aluminum, calcium and iron (in which case the agents are often called iron sequestering agents) to prevent their precipitation. Some of the formation-dissolving agents just described are such chelating agents as well. Chelating agents are added at a concentration, for example, of about 0.5% (of active ingredient). When VES fluids contain strong acids, they are typically not gelled and display low viscosity; when the pH increases as the acid reacts with the mineral, the system gels and the viscosity increases. Such fluids may be called viscoelastic diverting acids, or VDA's. The rheology enhancers may be used in viscoelastic surfactant fluid systems containing acids and chelating agents.

To provide the ionic strength for the desired micelle formation, in some cases, the VES fluid systems may comprise a water-soluble salt. Adding a salt may help promote micelle formation for the viscosification of the fluid in some instances. In some embodiments, the aqueous base fluid may contain the water-soluble salt, for example, where saltwater, a brine, or seawater is used as the aqueous base fluid. Suitable water-soluble salts may comprise lithium, ammonium, sodium, potassium, cesium, magnesium, calcium, or zinc cations, and chloride, bromide, iodide, formate, nitrate, acetate, cyanate, or thiocyanate anions. Examples of suitable water-soluble salts that comprise the above-listed anions and cations include, but are not limited to, ammonium chloride, lithium bromide, lithium chloride, lithium formate, lithium nitrate, calcium bromide, calcium chloride, calcium nitrate, calcium formate, sodium bromide, sodium chloride, sodium formate, sodium nitrate, potassium chloride, potassium bromide, potassium nitrate, potassium formate, cesium nitrate, cesium formate, cesium chloride, cesium bromide, magnesium chloride, magnesium bromide, zinc chloride, and zinc bromide.

The VES fluid systems may also typically contains proppants. The selection of a proppant involves many compromises imposed by economical and practical considerations. Criteria for selecting the proppant type, size, and concentration is based on the needed dimensionless conductivity, and can be selected by a skilled artisan. Such proppants can be natural or synthetic (including but not limited to glass beads, ceramic beads, sand, and bauxite), coated, or contain chemicals; more than one can be used sequentially or in mixtures of different sizes or different materials. The proppant may be resin coated, or pre-cured resin coated, provided that the resin and any other chemicals that might be released from the coating or come in contact with the other chemicals of the Invention are compatible with them. Proppants and gravels in the same or different wells or treatments can be the same material and/or the same size as one another and the term "proppant" is intended to include gravel in this discussion. In general the proppant used will have an average particle size of from about 0.15 mm to about 2.39 mm (about 8 to about 100 U.S. mesh), more particularly, but not limited to 0.25 to 0.43 mm (40/60 mesh), 0.43 to 0.84 mm (20/40 mesh), 0.84 to 1.19 mm (16/20), 0.84 to 1.68 mm (12/20 mesh) and 0.84 to 2.39 mm (8/20 mesh) sized materials. Normally the proppant will be present in the slurry in a concentration of from about 0.12 to about 0.96 kg/L, or from about 0.12 to about 0.72 kg/L, or from about 0.12 to about 0.54 kg/L. The fluid may also contain other enhancers or additives.

In other embodiments, the VES fluid systems may further comprise an additive for maintaining and/or adjusting pH (e.g., pH buffers, pH adjusting agents, etc.). For example, the additive for maintaining and/or adjusting pH may be included in the treatment fluid so as to maintain the pH in, or adjust the pH to, a desired range and thereby maintain, or provide, the necessary ionic strength to form the desired micellar structures. Examples of suitable additives for maintaining and/or adjusting pH include, but are not limited to, sodium acetate, acetic acid, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, sodium hydroxide, potassium hydroxide, lithium hydroxide, combinations thereof, derivatives thereof, and the like. The additive for adjusting and/or maintaining pH may be present in the treatment fluids of the embodiments according to the invention in an amount sufficient to maintain and/or adjust the pH of the fluid. One of ordinary skill in the art, with the benefit of this disclosure, will recognize the appropriate additive for maintaining and/or adjusting pH and amount thereof to use for a chosen application.

In some embodiments, the VES fluid systems may optionally comprise additional additives, including, but not limited to, acids, fluid loss control additives, gas, corrosion inhibitors, scale inhibitors, catalysts, clay control agents, biocides, friction reducers, combinations thereof and the like. For example, in some embodiments, it may be desired to foam the composition using a gas, such as air, nitrogen, or carbon dioxide. In one certain embodiment, the composition may contain a particulate additive, such as a particulate scale inhibitor.

Preparation and use (mixing, storing, pumping, etc.) of the improved VES fluid systems containing rheology enhancers are the same as for such fluids without the rheology enhancers. For example, the order of mixing is not affected by including these rheology enhancers. Optionally, the rheology enhancers may be incorporated in surfactant concentrates (provided that they do not affect component solubilities or concentrate freezing points) so that the concentrates can be diluted with an aqueous fluid to make VES systems. This maintains the operational simplicity of the VES systems. As is normally the case in fluid formulation, laboratory tests should be run to ensure that the additives do not affect, and are not affected by, other components in the fluid (such as salts, for example). In particular, the rheology enhancers may be used with other rheology modifiers. Adjusting the concentrations of surfactant, rheology enhancer, and other fluid components to account for the effects of other components is within the scope of the skilled in the art.

The optimal concentration of a given rheology enhancing additive for a given choice of VES surfactant fluid system at a given concentration and temperature, and with given other materials present, can be determined by simple experiments. The total viscoelastic surfactant concentration must be sufficient to form a viscoelastic gel under conditions at which the surfactants have sufficient aggregation tendency. The appropriate amounts of surfactant and rheology enhancer are those necessary to achieve the desired viscosity and shear recovery time as determined by experiment. Again, tolerance for, and optimal amounts of other additives may also be determined by simple experiment. In general, the amount of surfactant (as active ingredient) is from about 0.15% to about 3%. Commercially available surfactant concentrates may contain some materials that are themselves rheology enhancers, although they may be present for example for concentrate freezing point depression, so the amount of surfactant and rheology enhancer used is determined for the specific concentrate used. Mixtures of surfactants and/or mixtures of rheology enhancers (including mixtures of more than one rheology enhancer of the invention, and mixtures of one or more rheology enhancers of the invention with one or more other rheology enhancers) may be used. Mixtures of surfactants may include surfactants that are not viscoelastic surfactants when not part of a viscoelastic surfactant system. All mixtures are tested and optimized; for example, too much total rheology enhancer may decrease the beneficial effects.

The fluid may be used, for example in oilfield treatments. The fluids may also be used in other industries, such as in household and industrial cleaners, agricultural chemicals, personal hygiene products, cosmetics, pharmaceuticals, printing and in other fields.

The VES fluid systems may be used for carrying out a variety of subterranean treatments, where a viscosified treatment fluid may be used, including, but not limited to, drilling operations, fracturing treatments, and completion operations (e.g., gravel packing). In some embodiments, the VES fluid systems may be used in treating a portion of a subterranean formation. In certain embodiments, the VES fluid systems may be introduced into a well bore that penetrates the subterranean formation. Optionally, the VES fluid systems further may comprise particulates and other additives suitable for treating the subterranean formation. For example, the VES fluid systems may be allowed to contact the subterranean formation for a period of time sufficient to reduce the viscosity of the treatment fluid. In some embodiments, the VES fluid systems may be allowed to contact hydrocarbons, formations fluids, and/or subsequently injected treatment fluids, thereby reducing the viscosity of the treatment fluid. After a chosen time, the VES fluid systems may be recovered through the well bore.

In certain embodiments, the VES fluid systems may be used in fracturing treatments. In the fracturing embodiments, the composition may be introduced into a well bore that penetrates a subterranean formation at or above a pressure sufficient to create or enhance one or more fractures in a portion of the subterranean formation. Generally, in the fracturing embodiments, the VES fluid systems may exhibit viscoelastic behavior. Optionally, the VES fluid systems further may comprise particulates and other additives suitable for the fracturing treatment. After a chosen time, the VES fluid systems may be recovered through the well bore.

The VES fluid systems are also suitable for gravel packing, or for fracturing and gravel packing in one operation (called, for example frac and pack, frac-n-pack, frac-pack, StimPac treatments, or other names), which are also used extensively to stimulate the production of hydrocarbons, water and other fluids from subterranean formations. These operations involve pumping a slurry of "proppant" (natural or synthetic materials that prop open a fracture after it is created) in hydraulic fracturing or "gravel" in gravel packing. In low permeability formations, the goal of hydraulic fracturing is generally to form long, high surface area fractures that greatly increase the magnitude of the pathway of fluid flow from the formation to the wellbore. In high permeability formations, the goal of a hydraulic fracturing treatment is typically to create a short, wide, highly conductive fracture, in order to bypass near-wellbore damage done in drilling and/or completion, to ensure good fluid communication between the rock and the wellbore and also to increase the surface area available for fluids to flow into the wellbore.

Gravel is also a natural or synthetic material, which may be identical to, or different from, proppant. Gravel packing is used for "sand" control. Sand is the name given to any particulate material from the formation, such as clays, that could be carried into production equipment. Gravel packing is a sand-control method used to prevent production of formation sand, in which, for example a steel screen is placed in the wellbore and the surrounding annulus is packed with prepared gravel of a specific size designed to prevent the passage of formation sand that could foul subterranean or surface equipment and reduce flows. The primary objective of gravel packing is to stabilize the formation while causing minimal impairment to well productivity. Sometimes gravel packing is done without a screen. High permeability formations are frequently poorly consolidated, so that sand control is needed; they may also be damaged, so that fracturing is also needed. Therefore, hydraulic fracturing treatments in which short, wide fractures are wanted are often combined in a single continuous ("frac and pack") operation with gravel packing. For simplicity, in the following we may refer to any one of hydraulic fracturing, fracturing and gravel packing in one operation (frac and pack), or gravel packing, and mean them all.

To facilitate a better understanding of the embodiments disclosed herewith, the following examples are given. In no way should the following examples be read to limit, or define, the scope of the invention.

EXAMPLES

A series of experiments were conducted to compare viscosity with and without the rheology enhancer at different temperatures or concentrations.

The VES fluids for all experiments described below employed a betaine surfactant BET-E-40, which is commercially available from Rhodia, Inc. Cranbury, N.J. BET-E-40 contains approximately 38 wt % of erucic amidopropyl dimethyl betaine as active ingredient.

We have found that adding a very small amount of polydimethylsiloxanes grafted with ethylene/propylene glycol can significantly shorten the VES fluid recovery time. The tests were performed by shearing 200 mL of clean fluid at 80% power of Waring blender for 30 s and subsequently pour the fluid into a beaker back and forth to visually inspect the viscosity development over time. The time it takes for the fluid to form a "lip" is determined as the recovery time. The results demonstrate that polydimethylsiloxanes grafted with ethylene/propylene glycol serves as an excellent shear recovery agent. The effect of polydimethylsiloxanes grafted with ethylene/propylene glycol on the shear recovery time of VES fluids are shown in Table 1 below.

TABLE 1

| Fluids | Shear Recovery Time |
| --- | --- |
| 1% BET-E-40 | >2 minutes |
| 1% BET-E-40 + 30 ppm PS | 10 seconds |
| 3% BET-E-40 | >2 minutes |
| 3% BET-E-40 + 30 ppm PS | 5 seconds |

Figure 1:
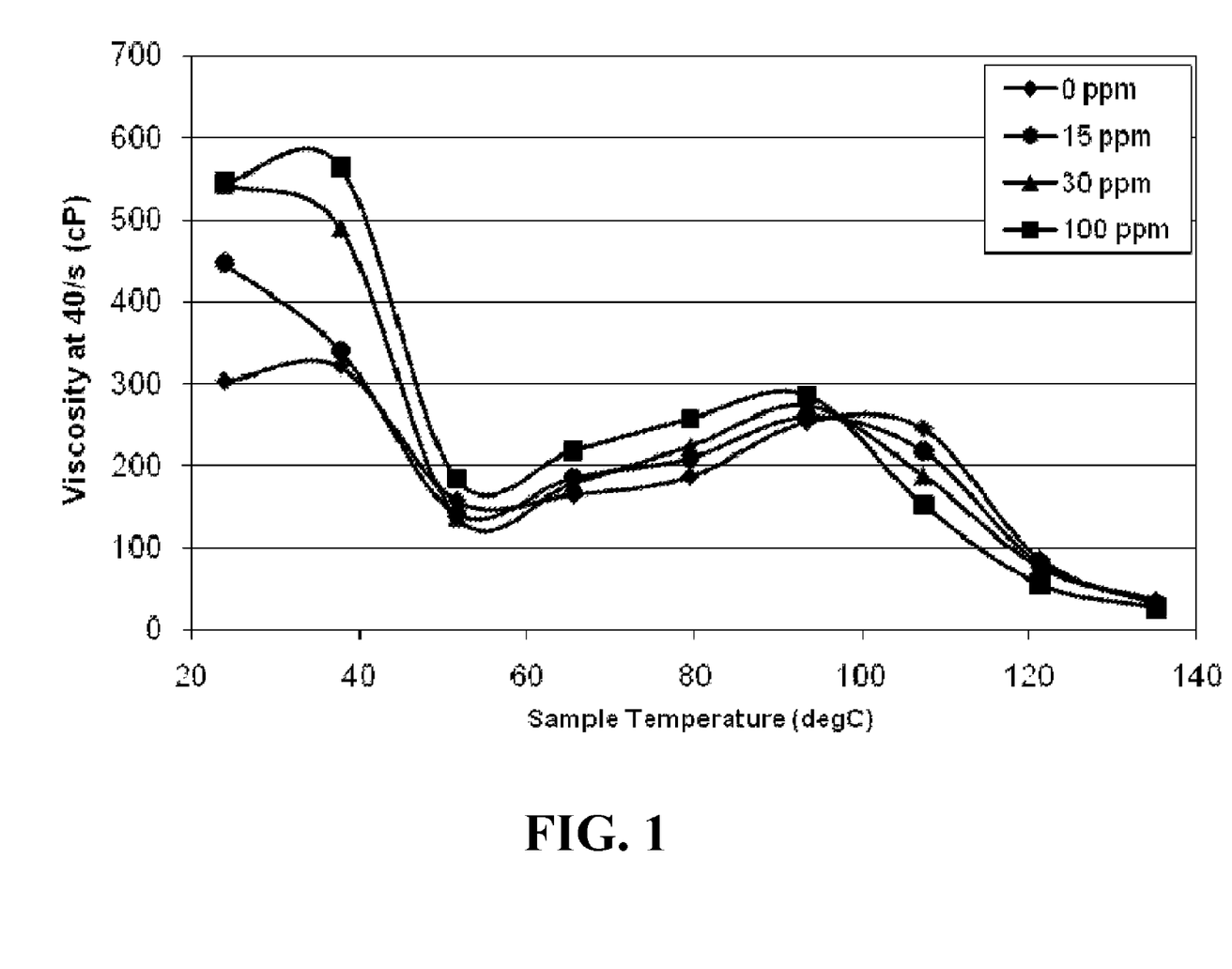
FIG. 1 shows viscosity as a function of temperature of fluids having various concentrations of a rheology enhancer.

The shear recovery agent not only shortens VES shear recovery time, it was also found to boost fluid viscosities. As an example, viscosities of sample fluids were measured on a Chandler 5550 rheometer at a constant shear rate of 40 s$^{-1}$ with temperature gradually increased from ambient to 135° C. (275° F.). Effect of polydimethylsiloxanes grafted with ethylene/propylene glycol at various concentrations on viscosity as a function of temperature for fluid containing 6 vol % BET-E-40 and 2 wt % KCl are shown on FIG. 1. FIG. 1 illustrates that as low as 15 ppm of polydimethylsiloxanes grafted with ethylene/propylene glycol can be effective to result in more viscous fluids. As the concentration of polydimethylsiloxanes grafted with ethylene/propylene glycol goes up, the viscosity increase becomes more significant. It is also noticed that the effect is more pronounced at lower temperatures. It should be noted 100 ppm of the grafted polydimethylsiloxane alone develops essentially no measurable viscosity in water.

Figure 2:
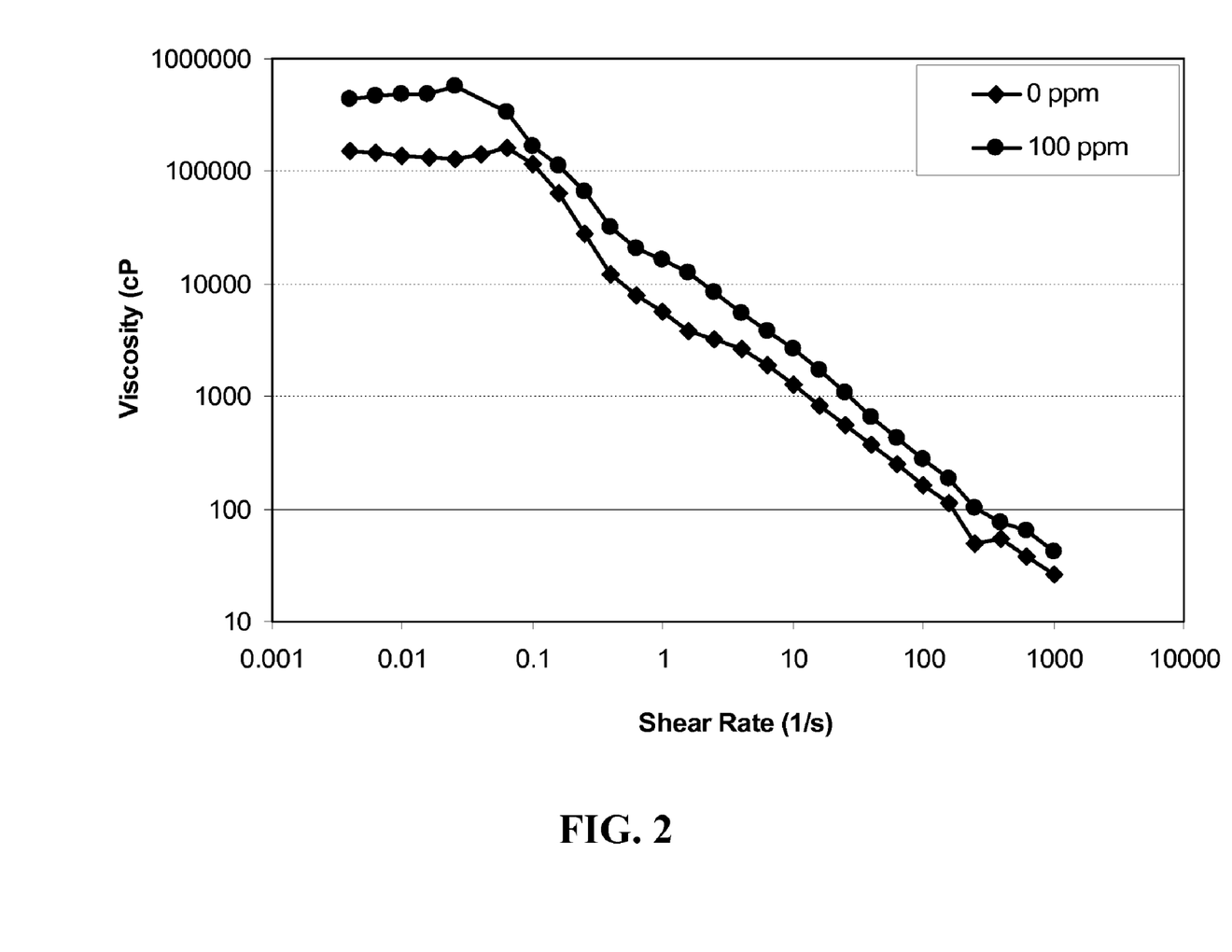
FIG. 2 shows viscosity as a function of shear rate at 20.5° C. of fluids having various concentrations of a rheology enhancer.

The effect of polydimethylsiloxanes grafted with ethylene/propylene glycol on VES fluid low shear viscosities was also investigated. Viscosity measurement over a shear rate range of 0.001 s$^{-1}$ and 1000 s$^{-1}$ was performed on a Bohlin rheometer at ambient temperature. Effect of polydimethylsiloxanes grafted with ethylene/propylene glycol on viscosity as a function of shear rate at 20.5° C. for fluid containing 6 vol % BET-E-40 and 2 wt % KCl are shown on FIG. 2. FIG. 2 clearly shows that the low shear viscosity is significantly improved with 100 ppm of polydimethylsiloxanes grafted with ethylene/propylene glycol and higher viscosities are maintained in the entire shear range. The data on FIG. 2 are plotted on a log-log scale.

It is concluded that ethylene/propylene glycol grafted polydimethylsiloxanes are excellent shear recovery agents for VES fluids. They are readily soluble in water, and the concentration needed can be as low as 15 ppm (0.0015 wt %). Presence of these amphiphilic polymers also significantly enhances fluid viscosity over a wide range of shear rates. Using these polymers as additives can improve fluid rheology and allow VES fluids to be used at much lower concentrations.

The foregoing disclosure and description of the invention is illustrative and explanatory thereof and it can be readily appreciated by those skilled in the art that various changes in the size, shape and materials, as well as in the details of the illustrated construction or combinations of the elements described herein can be made without departing from the spirit of the invention.

We claim:

1. A method comprising:
   a. providing a fluid comprising a viscoelastic surfactant selected from the group consisting of zwitterionic, amphoteric, nonionic, anionic, and cationic surfactants and mixtures thereof;
   b. adding to the fluid a rheology enhancer in a concentration sufficient to shorten the shear recovery time of the fluid, the rheology enhancer being a grafted polymer of polydimethylsiloxane; and
   c. injecting the fluid into a conduit, wherein the conduit is a well bore penetrating a subterranean formation.

2. The method of claim 1 wherein the grafted polymer is grafted with alkylene glycol.

3. The method of claim 1 wherein the grafted polymer is grafted with ethylene/propylene glycol.

4. The method of claim 1 wherein the viscoelastic surfactant comprises a zwitterionic surfactant.

5. The method of claim 1 wherein the zwitterionic surfactant comprises a surfactant or mixture of surfactants having the formula:

wherein R is an alkyl group that contains from about 11 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$.

6. The method of claim 1 wherein the zwitterionic surfactant has the betaine structure:

wherein R is a hydrocarbon group that may be branched or straight chained, aromatic, aliphatic or olefinic and has from about 14 to about 26 carbon atoms and may contain an amine; n=about 2 to about 4; and p=1 to about 5, and mixtures of these compounds.

7. The method of claim 6 wherein the betaine comprises oleylamidopropyl betaine.

8. The method of claim 6 wherein the betaine comprises erucylamidopropyl betaine.

9. The method of claim 6 wherein the fluid further comprises a co-surfactant.

10. The method of claim 1 wherein the viscoelastic surfactant comprises a cationic surfactant.

11. The method of claim 10 wherein the cationic surfactant comprises a surfactant or mixture of surfactants having the structure:

$$R_1N^+(R_2)(R_3)(R_4)X^-$$

in which $R_1$ has from about 14 to about 26 carbon atoms and may be branched or straight chained, aromatic, saturated or unsaturated, and may comprise a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion; and mixtures of these compounds.

12. The method of claim 11 wherein $R_1$ comprises from about 18 to about 22 carbon atoms and may comprise a carbonyl, an amide, or an amine; $R_2$, $R_3$, and $R_4$ comprise from 1 to about 3 carbon atoms, and $X^-$ is a halide.

13. The method of claim 12 wherein $R_1$ comprises from about 18 to about 22 carbon atoms and may comprise a carbonyl, an amide, or an amine, and $R_2$, $R_3$, and $R_4$ are the same as one another and comprise from 1 to about 3 carbon atoms.

14. The method of claim 1 wherein the fluid further comprises a member selected from the group consisting of amines, alcohols, glycols, organic salts, chelating agents, solvents, mutual solvents, organic acids, organic acid salts, inorganic salts, oligomers, and mixtures of said members.

15. The method of claim 14 wherein the member is present at a concentration of between about 0.01 and about 10 percent.

16. The method of claim 13 wherein the member is present at a concentration of between about 0.01 and about 1 percent.

17. The method of claim 1 wherein the amphoteric surfactant comprises an amine oxide.

18. The method of claim 15 wherein the amine oxide comprises an amidoamine oxide.

19. The method of claim 1 wherein the rheology enhancer is present in the fluid at a concentration of from about 0.0001% to about 0.5%.

20. The method of claim 19 wherein the rheology enhancer is present in the fluid at a concentration of from about 0.0001% to about 0.05%.

21. A method of shortening the shear recovery time of a viscoelastic surfactant based fluid comprising:
  a. providing a fluid comprising a viscoelastic surfactant selected from the group consisting of zwitterionic, amphoteric, nonionic, anionic, and cationic surfactants and mixtures thereof;
  b. adding to the fluid a rheology enhancer in a concentration sufficient to shorten the shear recovery time of the fluid, the rheology enhancer being a grafted polymer of polydimethylsiloxane; and
  c. injecting the fluid into a conduit, wherein the conduit is a well bore penetrating a subterranean formation.

22. The method of claim 21 wherein the grafted polymer is grafted with alkylene glycol.

23. The method of claim 21 wherein the grafted polymer is grafted with ethylene/propylene glycol.

* * * * *